Oct. 7, 1941.  H. H. SHORES  2,258,225
SPROCKET
Filed May 12, 1941   2 Sheets-Sheet 2
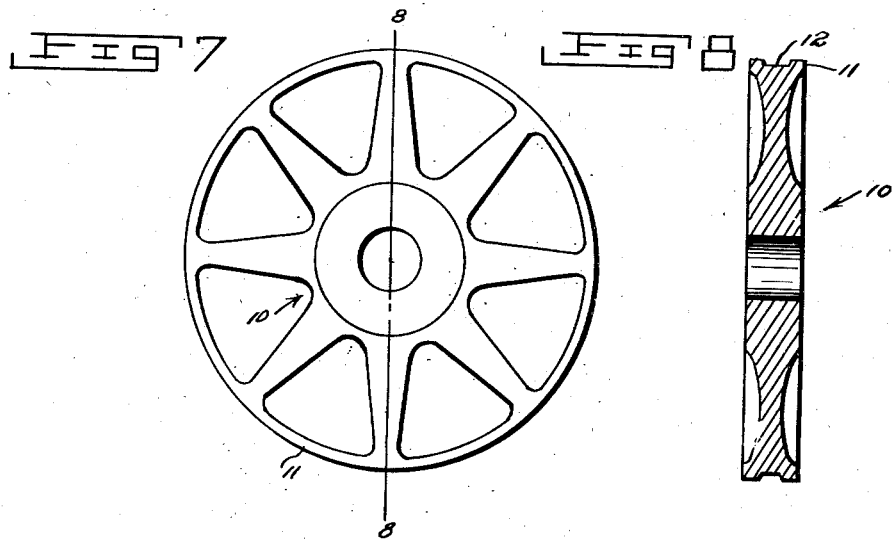
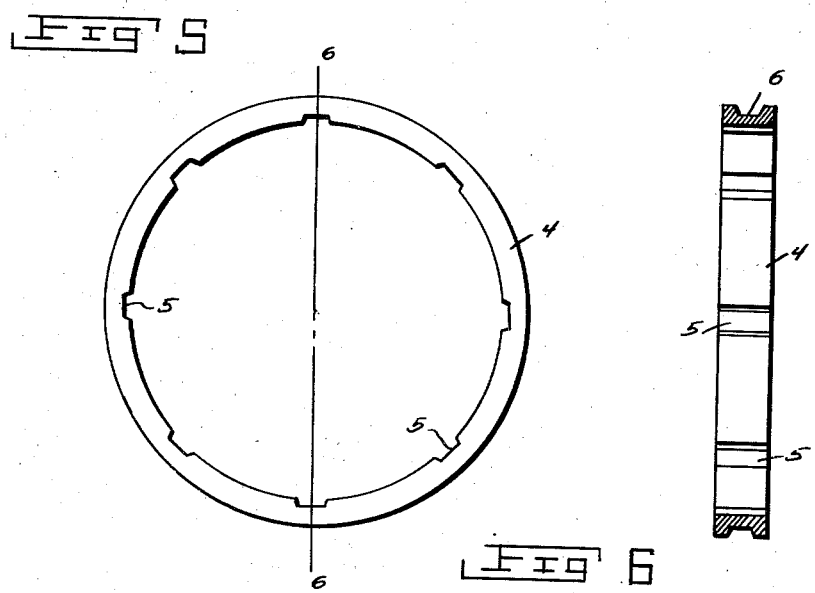
Inventor
HORACE H. SHORES
By Clarence A. O'Brien
Attorney Patented Oct. 7, 1941

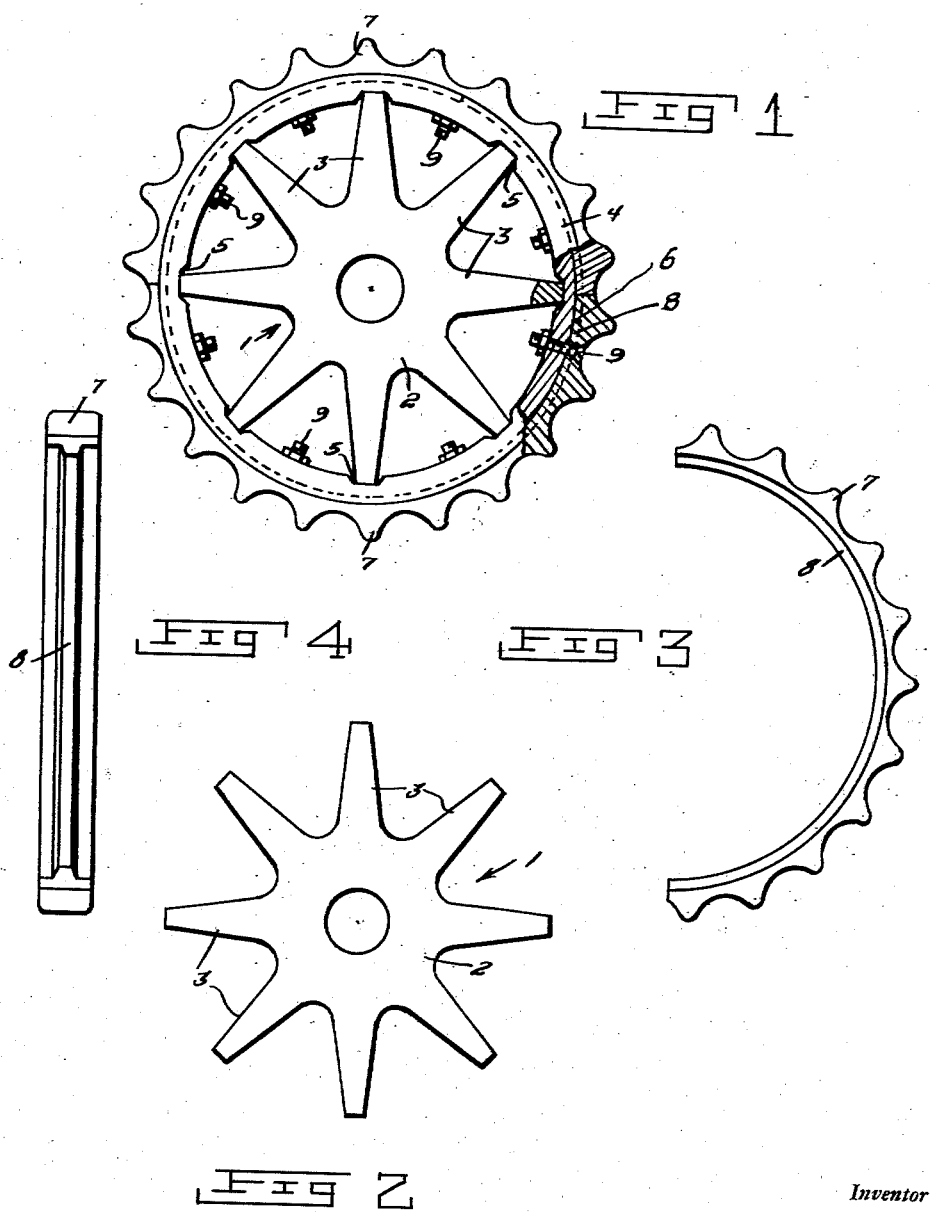

2,258,225

UNITED STATES PATENT OFFICE 2,258,225

SPROCKET

Horace H. Shores, Cottondale, Fla.

Application May 12, 1941, Serial No. 393,094

1 Claim. (Cl. 74—243)

The present invention relates to new and useful improvements in drive sprockets particularly for tractors and other self propelled machinery and has for its primary object to provide, in a manner as hereinafter set forth, a device of this character wherein the teeth and other portions which become worn may be expeditiously replaced without the necessity of removing the body of the sprocket from the shaft on which it is mounted.

Other objects of the invention are to provide a sprocket of the aforementioned character which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a sprocket constructed in accordance with the present invention, a portion of the device being broken away in section.

Figure 2 is a view in side elevation of the body.

Figure 3 is a view in side elevation of one of the removable toothed rim segments.

Figure 4 is an elevational view, looking at the interior of one of the removable toothed rim segments.

Figure 5 is a view in side elevation of the circumferentially grooved ring which is permanently mounted on the spokes of the body.

Figure 6 is a cross sectional view, taken substantially on the line 6—6 of Figure 5.

Figure 7 is a view in side elevation of the body of a cast sprocket.

Figure 8 is a cross sectional view, taken substantially on the line 8—8 of Figure 7.

Referring now to the drawings in detail, and to Figures 1 to 6, inclusive, thereof in particular, it will be seen that reference numeral 1 designates generally the body of the sprocket, which body may be of any suitable metal. The body 1 includes a hub 2 from which integral, tapered spokes 3 radiate. The hub 2 is to be secured on a shaft in any suitable manner.

Mounted on the body 1 and permanently secured thereto by welding is a ring 4 which may also be of any suitable metal. The inner circumference of the ring 4 has formed therein transversely extending grooves or notches 5 for the reception of the free or outer end portions of the spokes 3. Thus, the ring 4 is adapted to be slipped laterally on the spokes 3 and said spokes are then welded in the grooves or notches 5. As illustrated to advantage in Figure 6 of the drawings, the periphery of the ring 4 has formed therein a circumferentially extending groove or channel 6 the side walls of which are oppositely inclined.

Removably mounted on the ring 4 is a pair of toothed rim segments 7. Formed on the interior of the rim segments 7 are circumferentially extending, integral ribs 8. The ribs 8 are of a cross sectional shape corresponding to the shape of the groove or channel 6 and said ribs are adapted to seat or engage therein. Bolts 9 detachably but firmly secure the rim segments 7 in position on the ring 4. Of course, the elements 4 and 7 have formed therein registering openings which accommodate the bolts 9. As shown in Figure 1 of the drawings, the heads of the bolts 9 are countersunk in the rim segments 7 between the teeth of said rim segments.

It will thus be seen that a sprocket has been provided wherein the teeth and other portions which are subjected to wear may be conveniently removed for replacement without the necessity of disturbing the rest of said sprocket on its shaft. This, of course, is accomplished by removing the bolts 9. The ribs 8 facilitate positioning and securing the rim segments 7 on the ring 4 in addition to strengthening said rim segments.

In Figures 7 and 8 of the drawings, reference character 10 designates generally a cast body of suitable metal comprising an integral ring 11. The ring 11 has formed in its periphery a circumferential groove or channel 12 for the reception of the ribs 8 of the rim segments 7. In other respects this form of the invention is substantially similar to the embodiment illustrated in Figures 1 to 6, inclusive, of the drawings.

It is believed that the many advantages of a sprocket constructed in accordance with the present invention will be readily understood and although preferred embodiments of the device are as illustrated and described, it is to be understood that changes in the details of construction and in the combination and arrangement of parts may be resorted to which will fall within the scope of the invention as claimed.

What is claimed is:

A sprocket comprising a body including a hub and integral spokes radiating from said hub, a ring mounted on the body, said ring having transversely extending grooves in its inner circumference for the reception of the free end portions of the spokes, said ring further having a circumferentially extending channel in its periphery, a plurality of toothed rim segments mounted on the ring, integral ribs in the rim segments engaged in the channel, and means detachably securing the rim segments in position on the ring.

HORACE H. SHORES.